United States Patent
Fuchs

(10) Patent No.: US 7,037,982 B2
(45) Date of Patent: May 2, 2006

(54) RUBBER MIXTURES FOR ROLL COVERINGS

(75) Inventor: Erich Fuchs, Leverkusen (DE)

(73) Assignee: Bayer Aktiengesellschaft, Leverkusen (DE)

(*) Notice: Subject to any disclaimer, the term of this patent is extended or adjusted under 35 U.S.C. 154(b) by 119 days.

(21) Appl. No.: 10/053,166

(22) Filed: Jan. 15, 2002

(65) Prior Publication Data

US 2002/0132892 A1 Sep. 19, 2002

(30) Foreign Application Priority Data

Jan. 17, 2001 (DE) .............................. 101 02 047

(51) Int. Cl.
- *C08F 236/12* (2006.01)
- *C08F 36/06* (2006.01)
- *C08F 120/44* (2006.01)

(52) U.S. Cl. .............................. 525/329.3; 525/329.1; 525/331.9; 525/386; 524/261; 524/413; 524/442; 524/495; 524/432; 524/433

(58) Field of Classification Search ................ 524/565, 524/394, 306, 314, 311, 261, 413, 442, 495, 524/432, 433; 525/329.3, 329.1, 331.9, 386
See application file for complete search history.

(56) References Cited

U.S. PATENT DOCUMENTS

| | | | |
|---|---|---|---|
| 3,700,637 A | 10/1972 | Finch, Jr. | 260/83.3 |
| 4,337,329 A | 6/1982 | Kubo et al. | 525/339 |
| 4,384,081 A | 5/1983 | Kubo et al. | 525/330 |
| 4,452,951 A | 6/1984 | Kubo et al. | 525/339 |
| 4,503,196 A | 3/1985 | Rempel et al. | 525/338 |
| 4,581,417 A | 4/1986 | Buding et al. | 525/338 |
| 4,826,910 A * | 5/1989 | Schwarz | 524/521 |
| 4,857,571 A * | 8/1989 | Reiter et al. | 524/248 |
| 4,897,440 A | 1/1990 | Lo | 524/521 |
| 4,983,678 A | 1/1991 | Saito et al. | 525/193 |
| 4,987,192 A * | 1/1991 | Oberster et al. | 525/274 |
| 5,157,083 A | 10/1992 | Aonuma et al. | 525/285 |
| 5,208,294 A | 5/1993 | Brown | 525/263 |
| 5,217,807 A * | 6/1993 | Steiber et al. | 428/378 |
| 5,391,627 A | 2/1995 | Araki et al. | 525/274 |
| 5,584,771 A | 12/1996 | Isshiki et al. | 474/264 |
| 5,637,407 A * | 6/1997 | Hert et al. | 428/474.7 |
| 5,859,155 A | 1/1999 | Furihata et al. | 525/531 |
| 5,985,392 A * | 11/1999 | Hert et al. | 428/36.8 |
| 6,087,453 A | 7/2000 | Nishimura | 525/329.2 |
| 6,093,767 A | 7/2000 | Davis et al. | 524/492 |
| 6,538,071 B1 * | 3/2003 | Fuchs | 524/274 |
| 2002/0132892 A1 * | 9/2002 | Fuchs | 524/261 |

FOREIGN PATENT DOCUMENTS

| | | |
|---|---|---|
| CA | 2317318 | 3/2001 |
| CA | 2304501 | 10/2001 |
| EP | 0 111 412 | 8/1989 |
| EP | 0 933 381 | 8/1999 |
| EP | 0 933 381 A1 * | 8/1999 |
| GB | 1558491 | 1/1980 |

OTHER PUBLICATIONS

Bandyopadhyay S et al: "Interaction Between Carboxylated Nitrile Rubber and Precipitated Silica: Role of (3-Aminopropyl) Triethyoxysilane" Rubber Chemistry and Technology, Rubber Division Acs. Akron, US, Bd. 69, Nr. 4, Sep. 1, 1996, Seiten 637-647, XP000643469 ISSN: 0035-9475 Gesamtes Dokument.

* cited by examiner

Primary Examiner—David W. Wu
Assistant Examiner—Rip A. Lee
(74) Attorney, Agent, or Firm—Jennifer R. Seng

(57) ABSTRACT

This invention relates to a rubber mixture containing a carboxylated nitrile rubber, a metal salt of an acrylate, a liquid acrylate, a silane, optionally together with further additives, to a process for the production thereof and to use for moldings of all kinds, in particular roll coverings.

9 Claims, No Drawings

RUBBER MIXTURES FOR ROLL COVERINGS

FIELD OF THE INVENTION

This invention relates to a rubber mixture containing a carboxylated nitrile rubber, a metal salt of an acrylate, a liquid acrylate, a silane, optionally together with further additives, to a process for the production thereof and to use for moldings of all kinds, in particular roll coverings.

BACKGROUND OF THE INVENTION

Rolls with a covering of rubber are used in many applications, inter alia in the printing and textiles industry, in machinery, such as fax machines, and in the steel and papermaking industries.

Prior application DE-A-199 42 743 discloses a rubber mixture containing a nitrile rubber, a metal salt of an acrylate, a liquid acrylate, a silane, optionally together with further additives, to a process for the production thereof and use for moldings of all kinds, in particular roll coverings. A carboxylated nitrile rubber is, however, not disclosed.

Especially in the steel and papermaking industries, roll coverings are exposed to extreme stresses. In such applications, the coverings are primarily required to exhibit a combination of the following properties:
  low compression set
  low abrasion
  slight swelling in the media used
  good thermal and chemical resistance
  excellent adhesion between the covering and metal substrate
  slight heat build-up on exposure to stress.

SUMMARY OF THE INVENTION

We have now found that a rubber mixture containing a nitrile rubber, which furthermore, contains a metal salt of an acrylate, a liquid acrylate and a silane, is particularly suitable as a starting material for rubber coverings for rolls.

The present invention accordingly provides a rubber mixture containing
a) one or more carboxylated nitrile rubbers
b) one or more metal salts of an acrylate
c) one or more liquid acrylates optionally applied onto a support,
d) from 0.01 to 10 phr of one or more silanes, and
e) optionally further additives and/or fillers.

DETAILED DESCRIPTION OF THE INVENTION

Nitrile rubbers are taken to mean diene/(meth)acrylonitrile copolymers. Preferred dienes in this connection are isoprene and in particular, butadiene. The copolymers have a content of copolymerized acrylonitrile and/or methacrylonitrile units of 5 to 60, preferably of 10 to 50 wt.%.

Hydrogenated nitrile rubbers are furthermore, explicitly subsumed within this term. For the purposes of this invention, "hydrogenated nitrile rubber" or "HNBR" should be taken to mean nitrile rubbers, the C=C double bonds of which have been partially or entirely hydrogenated in a selective manner (i.e. without hydrogenation of the C≡N triple bond). Preferred hydrogenated nitrile rubbers are those having a degree of hydrogenation, relative to the C=C double bonds originating from the butadiene, of at least 75, preferably of at least 95, in particular of at least 98%. The degree of hydrogenation may be determined by NMR and IR spectroscopy.

Carboxylated nitrile rubbers are taken to mean nitrile rubbers which bear acid (—COOH) or ester (—COOR) side groups. The production of such carboxylated nitrile rubbers is described, for example, in EP-A1-0 933 381 or U.S. Pat. No. 5,157,083. The carboxylated nitrile rubber described in CA-2,304,501 is, however, particularly suitable.

The hydrogenation of nitrile rubber is known; U.S. Pat. No. 3,700,637, DE-A-2 539 132, DE-A-3 046 008, DE-A-3 046 251, DE-A-3 227 650, DE-A-3 329 974, EP-A-111 412, and FR-B-2 540 503. Hydrogenated nitrile rubber is distinguished by elevated tear strength, slight abrasion, low residual deformation after exposure to compressive or tensile stresses and good oil resistance, but above all by remarkable stability on exposure to thermal and oxidative stresses. Hydrogenated carboxylated nitrile rubbers are accordingly preferred for the purposes of the present invention. The hydrogenated, carboxylated nitrile rubber described in CA-2,304,501 is very suitable.

Preferred mixtures are those in which the carboxylated nitrile rubber is selected from carboxylated NBR, partially hydrogenated carboxylated NBR and completely hydrogenated carboxylated NBR or mixtures of two or more of the members of the group.

Suitable nitrile rubbers generally have Mooney viscosities (DIN 53 523, ML 1+4) of 25 to 100 MU, preferably 40 to 80 MU.

It is known to add metal salts of an acrylate to mixtures containing nitrile rubbers. Suitable acrylates may be in unsubstituted or substituted form. Examples of substituted acrylates are methacrylates.

Suitable acrylates are known to the person skilled in the art from EP-A1-0 319 320, in particular page 3, lines 16 to 35, from U.S. Pat. No. 5,208,294, in particular column 2, lines 25 to 40, from U.S. Pat. No. 4,983,678, in particular column 2, lines 45 to 62. Zinc acrylate, zinc diacrylate and zinc dimethacrylate may, in particular, be mentioned in this connection.

It may be advantageous to add the metal salt of the acrylate together with a scorch retarder. Compounds which may be considered for this purpose are, for example, hindered phenols, such as methyl-substituted aminoalkylphenols, in particular 2,6-di-tert.-butyl-4-dimethylaminomethylphenol.

Any acrylate known to the person skilled in the art which is liquid at room temperature may be considered as the liquid acrylate.

Trimethylolpropane trimethacrylate (TRIM), butanediol dimethacrylate (BDMA) and ethylene glycol dimethacrylate (EDMA) are preferred.

In order to achieve better incorporability, it may be advantageous to use the liquid acrylate bound on a support. Supports which may be considered are, for example, silicates, precipitated silicas, clays, carbon black, talcum or polymers. Mixtures containing 5 to 50 wt. % of support are generally used.

Silanes can be used as reinforcing additives. Vinylsilanes, such as vinyltrimethoxysiloxane or vinyltris(2-methoxyethoxy)silane, are used for peroxide vulcanization. These silanes are commercially available.

The silanes are used in quantities ranging from 0.01 to 10 phr, preferably in the range from 1 to 3 phr.

The unit "phr" is taken to mean parts by weight per 100 parts by weight of rubber.

Mixtures of various silanes may also be used.

It may also be advantageous to use the entire quantity of silane or also a proportion in a form applied onto a support.

Suitable supports are any fillers disclosed in the present invention, which may optionally be pretreated.

Further additives, which may be considered are, for example, vulcanization activators known to the person skilled in the art, in particular metal oxides, such as zinc oxide or magnesium oxide, antioxidants, such as alkyl-substituted diphenylamines, mercaptobenzimidazoles, unsaturated ethers, such as Vulkazon® AFD (Bayer AG, DE) or cyclic, unsaturated acetals, such as Vulkazon® AFS/LG (Bayer AG, DE). Further additives which may be mentioned are:

- plasticizers, in particular carboxylic acid esters, such as sebacic acid and the derivatives thereof or trimellitic acid and the derivatives thereof
- processing auxiliaries, in particular stearic acid the derivatives thereof, such as zinc stearate or polymers, such as polyethylene/vinyl acetate (Levapren® from Bayer AG, DE) or polyethylene/vinyl acrylate (VAMAC® from DuPont).

It may, furthermore, be advantageous to incorporate fillers into the rubber mixture according to the present invention. These fillers may or may not have a reinforcing action.

Fillers which may be mentioned, by way of example, are:
- carbon blacks, such as MT, GPF, SRF and, especially, FEF, carbon blacks,
- metal oxides, such as titanium dioxide (especially as a white pigment)
- silicates, such as sodium aluminum silicate
- silicas, in particular precipitated silicas Improved abrasion is suitably achieved by preferably using so-called active fillers according to proposal ISO 5794, appendix D, part 1, for example published on page 535 of Handbuch für die Gummiindustrie, published by Bayer AG, 1992, Leverkusen.
- clays, mica, talcum.

Pigments may, furthermore, be added.

The quantities of the individual components in the mixture are a function of the intended purpose of the mixture and may be determined by some preliminary testing.

The substances are generally used in the following quantities (in each case in phr=parts per hundred parts of rubber):
- metal salt of an acrylate 10 to 120 phr, preferably 10 to 85 phr, more preferably 20 to 65 phr,
- liquid acrylate 5 to 80 phr, preferably 20 to 60 phr, in each case calculated without support,
- antioxidant 0 to 4 phr,
- retarder 0 to 2 phr,
- metal oxides, such as ZnO, 0 to 30 phr,
- fillers 0 to 150 phr, preferably active fillers,
- silanes 0 to 10 phr,
- plasticizers 0 to 20 phr,
- processing auxiliaries 0 to 2 phr.

The present invention also provides vulcanizable mixtures containing the rubber mixtures according to the present invention, as well as a process for the production of the rubber mixtures according to the present invention and vulcanizable rubber mixtures, characterized in that the components are mixed in a mixing unit.

The mixtures are advantageously produced in a laboratory kneader (for example GK 1.5 E from Krupp Elastomertechnik, Hamburg), cooling water temperature in the range from 10 to 50° C., rotary speed of paddle in the range from 5 to 70 rpm, piston pressure 6 bar, filling level of kneader 50 to 95%, relative to the kneader chamber volume.

The following mixing sequence is advantageous: initially introduce the rubber, add remaining constituents after 0.5 to 5 minutes' running, empty the kneader at a batch temperature of <130° C. The peroxide is preferably subsequently incorporated on a roll mill (Krupp Elastomertechnik, Hamburg), roll diameter 200 mm, working width 350 mm) at a cooling water temperature of 10 to 50° C.

Vulcanizable mixtures are produced from the mixtures according to the present invention by adding vulcanizing agents to the rubber mixtures according to the present invention. Suitable vulcanizing agents are peroxide systems and combinations of peroxide systems and zinc peroxide (supported or polymer-bound, active substance content 30 to 50%).

Preferred peroxide systems comprise
dialkyl peroxides,
ketal peroxides,
aralkyl peroxides,
peroxide ethers,
peroxide esters, such as for example di-tert.-butyl peroxide bis(tert.-butylperoxyisopropyl)benzene,
dicumyl peroxide,
2,5-dimethyl-2,5-di-(tert.-butylperoxy)hexane,
2,5-dimethyl-2,5-di-(tert.-butylperoxy)-3-hexene,
1,1-bis(tert.-butylperoxy)-3,3,5-trimethylcyclohexane,
benzoyl peroxide,
tert.-butylcumyl peroxide and
tert.-butyl perbenzoate.

The quantities of peroxide are in the range from 1 to 10 phr, preferably in the range from 4 to 8 phr, relative to rubber. The quantities of zinc peroxide are in the range from 1 to 10 phr, preferably in the range from 4 to 8 phr, relative to rubber. Combinations of peroxide and zinc peroxide generally yield a higher level of vulcanization and hardness. Vulcanization may proceed at temperatures of 100 to 200° C., preferably of 130 to 180° C., optionally under a pressure of 10 to 200 bar. After vulcanization, the vulcanizates may be conditioned by being kept at elevated temperature.

The peroxides may advantageously also be used in polymer-bound form. Such systems are commercially available, such as for example Polydispersion T(VC) D-40 P from Rhein Chemie Rheinau GmbH, DE (=polymer-bound di-tert.-butylperoxyisopropylbenzene).

Vulcanization may also be achieved by high-energy radiation.

For the purposes of the present invention, vulcanization means that less than 10, preferably less than 5 wt. %, relative to rubber, is extractable by 10 hours' extraction in a Soxhlet apparatus with toluene as the extracting agent.

The optimum quantity of vulcanizing agent is readily determined by preliminary testing. It is known in this connection that the required quantity of peroxide is indirectly proportional to the residual double bond content of the rubber.

The mixing unit used may be any mixing unit for rubbers known to the person skilled in the art, in particular kneaders and roll mills.

Care must be taken in this connection that the rubber is not degraded during the mixing operation. It may be advantageous to provide cooling during the mixing operation. In order to avoid scorching, the peroxide and zinc peroxide are frequently added as the final component, optionally in a separate mixing operation.

The present invention also provides for the use of the rubber mixtures according to the present invention for the production of moldings of any kind, preferably, coverings for rolls, more preferably, rolls for the papermaking, textiles, printing and steel industry.

Rolls generally contain a metal core of variable diameter. The metal core generally contains steel of variable composition, onto which the vulcanizable rubber mixture is applied using processes conventional in the prior art and then vulcanized. Good adhesion between the covering and metal and within the covering is essential in this connection. It may be advantageous to improve adhesion between the covering and metal by means of coupling agents such as dispersions/solutions of halogenated polymers, optionally with crosslinking agents/fillers/pigments. These substances are commercially available.

The rubber mixtures according to the present invention are suitable for roll applications because, once vulcanized, they combine excellent hardness and excellent mechanical properties in the range from above 20 Shore D to DIN 53 506, even at elevated service temperatures, with good resistance to abrasion, heat, water and basic chemicals. This balanced range of properties cannot be achieved according to the prior art. The rubber mixtures according to the present invention are, of course, also suitable for the production of other moldings, such as profiles, belts, rings, seals, damping elements etc.

For this reason, the present invention also provides moldings, in particular rolls and belts, which may be produced using a rubber mixture according to the present invention.

It is also possible to fine tune the properties of the mixtures according to the invention by adding further polymers, such as BR, NR, IIR, IR, EPDM, EPM, CR, SBR, AEM, ACM or fluoropolymers.

The following Examples are intended to illustrate the invention without limiting it.

EXAMPLES

Measurement methods

| | |
|---|---|
| Residual double bond content | IR spectroscopy |
| Mooney viscosity (ML 1 + 4 (100° C.)) | ASTM D 1646 (stated in MU) |
| Volatile constituents (wt. %) | ASTM D 1416 |
| Ash content (wt. %) | ASTM D 1416 |
| Acrylonitrile (ACN) content (wt. % bound in polymer) | in accordance with method below: |

Brief Description of Method for Determining ACN

The rubber is analyzed by being pyrolyzed in a stream of oxygen on a catalyst at 900° C. The unconsumed oxygen is absorbed in a copper reduction reactor and the resultant NO—X gases are reduced to nitrogen. The $CO_2$ is then removed from the stream of gas under analysis in an $Na_2CO_3$/NaOH trap, while any water is removed in an $MgClO_4$ trap. The change in thermal conductivity of the gas under analysis relative to the carrier gas stream is a measure of the nitrogen content of the sample.

Apparatus for the Above Method
  NA 2000 model protein analyzer, Fisons
  Micro model microbalance, Sartorius
  Evaluation unit, Digital, DECpc Lpx 433 dx with interfaces to NA 2000 and balance interface, and EAGER 200 software.

Chemicals & Solvents for the Above Method Methionine from Hekatech

| Formulation constituents for the invention | | |
|---|---|---|
| Therban ® test product KA 8837 | Bayer AG | 20% RDB, 34% ACN, 55 MU |
| Therban ® C 3446 | Bayer AG | HNBR with 4% RDB, 34% ACN, 58 MU |
| Therban XT test product KA 8889 | Bayer AG | HNBR with 3.5% RDB, 32% ACN, 74 MU, carboxylic acid 5% |
| Zinkoxyd aktiv | Bayer AG | Active zinc oxide |
| Magnesium oxide paste | Treffert Rheinau GmbH | Magnesium oxide paste |
| Rhenofit DDA-70 | Rhein Chemie Rheinau GmbH | Diphenylamine derivative |
| Vulkanox ® ZMB 2 | Bayer AG | Zinc methylmercapto-benzimidazole |
| Tronox ® R-UF | McGee | Titanium dioxide, rutile type |
| Vulkasil ® S | Bayer AG | Precipitated silica |
| Sartomer SR633 | Sartomer | Zinc diacrylate with added retarder |
| Sartomer SR634 | Sartomer | Zinc dimethacrylate with added retarder |
| Rhenofit ® TRIM/S | Rhein Chemie Rheinau GmbH | Trimethylolpropane trimethacrylate 70%/bound to silica 30% |
| Ethanox 703 | Albemarle, BE | 2,6-di-tert.-butyl-4-(dimethyl-amino)phenol |
| Polydispersion T(VC) | Rhein Chemie | Di-(tert.-butylperoxy-isopropyl)- |
| D-40 P | Rheinau GmbH | benzene, polymer-bound |
| Zinc peroxide 55% | Riedel de Haan | Zinc peroxide (on filler) |
| Silquest RC-1 (silane) | UCC | Vinylsilane |
| Armeen 18 D | Flexys | Octadecylamine |

Production of the Mixtures

The mixtures were produced in a GK 1.5 E laboratory kneader (Krupp Elastomertechnik, Hamburg), cooling water temperature 50° C., rotational speed of paddle 50 rpm, piston pressure 6 bar, filling level of kneader 70–80%, relative to the kneader chamber volume. Mixing sequence: Initially introduce rubber, add remaining constituents after 1 minute's running, empty the kneader at a temperature of <130° C. The peroxide was subsequently incorporated on a roll mill (Krupp Elastomertechnik, roll diameter 200 mm, working width 350 mm) at a cooling water temperature of 40° C.

The sheets for determining mechanical properties were crosslinked/vulcanized under the stated conditions in a vulcanizing press (Krupp Elastomertechnik) between Teflon films.

| Testing of the mixtures | | | |
|---|---|---|---|
| Value: | Dimension | Properties: | Test standard: |
| ML 1 + 4, 100° C. | MU | Mooney viscosity | DIN 53523, part 3 |
| MS-T5, 120° C. | min | Mooney scorch behaviour (time to 5 MU above minimum) | DIN 53523, part 4 |
| MDR rheometer | | Vulcanization profile | DIN 53529, part 3 |
| Minimum, maximum, Max.–Min. | S'dNm | Minimum/maximum torque, max./min. difference | |
| T10, T50, T80, T90 | min | Time to 10%, 50%, 80%, 90% conversion | |
| F | MPa | Tensile strength | DIN 53504 |

-continued

| Value: | Dimension | Properties: | Test standard: |
|---|---|---|---|
| | | Testing of the mixtures | |
| D | % | Elongation at break | DIN 53504 |
| S xxx | MPa | Modulus at xxx % elongation | DIN 53504 |
| H | Shore A/D | Hardness | DIN 53505 |
| E | % | Rebound elasticity | DIN 53512 |

Example 1

Mixtures 1a to 1e were produced as described in the "production of the mixtures" section from the starting materials described in Table 1 and were tested.

The test results are shown in Table 2.

TABLE 1

| Mixture | Mixture 1a | Mixture 1b | Mixture 1c | Mixture 1d | Mixture 1e |
|---|---|---|---|---|---|
| Therban C3446(a) | 100 | 75 | 50 | — | — |
| Therban XT KA8889 | — | 25 | 50 | 100 | 100 |
| Vulkasil S | 30 | 30 | 30 | 30 | 30 |
| Vinylsilane (Silquest RC-1) | 2 | 2 | 2 | 2 | 2 |
| Tronox R-UF | 3 | 3 | 3 | 3 | 3 |
| Rhenofit DDA-70 | 1.3 | 1.3 | 1.3 | 1.3 | 1.3 |
| Vulkanox ZMB-2 | 0.5 | 0.5 | 0.5 | 0.5 | 0.5 |
| Rhenofit TRIM/S | 15 | 15 | 15 | 15 | 15 |
| Sartomer SR 633 | 15 | 15 | 15 | 15 | — |
| Sartomer SR 634 | — | — | — | — | 15 |
| Ethanox 703 | 1 | 1 | 1 | 1 | 1 |
| Zinc peroxide | 6 | 6 | 6 | 6 | 6 |
| Polydispersion T (VC) D-40 P | 6 | 6 | 6 | 6 | 6 |
| Armeen 18 D | 3 | 3 | 3 | 3 | 3 |
| Total parts by weight | 179.8 | 179.8 | 179.8 | 179.8 | 179.8 |
| Density (g/cm³) | 1.19 | 1.20 | 1.20 | 1.21 | 1.20 |

TABLE 2

| Mixture properties | Mixture 1a | Mixture 1b | Mixture 1c | Mixture 1d | Mixture 1e |
|---|---|---|---|---|---|
| MS-T5/120° C. | >45 | >45 | >45 | >45 | >45 |
| MDR rheometer 160° C./run time 40 min | | | | | |
| Minimum (S'dNm) | 1.3 | 1.3 | 1.5 | 1.9 | 1.8 |
| Maximum | 65.7 | 74.8 | 73.8 | 52.9 | 55.8 |
| Max.–Min. | 64.4 | 73.5 | 72.2 | 51.0 | 54.1 |
| T10 (min) | 3.1 | 3.2 | 3.1 | 3.6 | 3.7 |
| T50 | 6.6 | 6.4 | 6.0 | 6.4 | 7.4 |
| T80 | 15.2 | 14.3 | 13.0 | 12.7 | 17.0 |
| T90 | 21.7 | 20.6 | 19.1 | 18.5 | 24.2 |
| MDR rheometer 180° C./run time 10 min | | | | | |
| Minimum (S'dNm) | 1.0 | 1.0 | 1.2 | 1.4 | 1.3 |
| Maximum | 61.7 | 69.9 | 62.6 | 41.3 | 35.3 |
| Max.–Min. | 60.7 | 68.9 | 61.4 | 39.9 | 33.9 |
| T10 (min) | 0.7 | 0.7 | 0.7 | 0.7 | 0.8 |
| T50 | 1.1 | 1.0 | 1.0 | 1.0 | 1.6 |
| T80 | 2.4 | 2.2 | 2.0 | 1.9 | 3.5 |
| T90 | 3.4 | 3.2 | 3.0 | 2.9 | 5.0 |
| Vulcanization 30 min 160° C. | | | | | |
| F (MPa) | 23.4 | 25.5 | 25.3 | 36.2 | 35.6 |
| D (%) | 325 | 285 | 205 | 245 | 270 |
| S 50 (MPa) | 4.5 | 8.3 | 10.8 | 9.1 | 9.2 |
| S 100 (MPa) | 7.3 | 12.3 | 16.5 | 17.3 | 16.2 |
| H 23° C. (Sh. A) | 90 | 94 | 93 | 92 | 92 |
| H 23° C. (Sh. D) | 39 | 48 | 49 | 46 | 49 |
| E 23° C. (%) | 45 | 44 | 40 | 34 | 34 |
| Tear propagation resistance to DIN 53515 (N/mm) | 25 | 29 | 27 | 21 | 28 |

Example 2

Mixtures 2a to 2e were produced in a similar manner to Example 1 from the starting materials described in Table 3 and were tested.

The results are shown in Table 4.

TABLE 3

| Mixture | Mixture 2a | Mixture 2b | Mixture 2c | Mixture 2d | Mixture 2e |
|---|---|---|---|---|---|
| Therban KA 8837 | 100 | 100 | — | — | 50 |
| Therban XT KA8889 | — | — | 100 | 100 | 50 |
| Zinkoxyd Aktiv | 2 | 2 | — | — | — |
| MgO paste | 2 | 2 | — | — | — |
| Vulkasil S | 50 | 50 | 50 | 50 | 50 |
| Vinylsilane (Silquest RC-1) | 2 | 2 | 2 | 2 | 2 |
| Tronox R-UF | 3 | 3 | 3 | 3 | 3 |
| Rhenofit DDA-70 | 1.3 | 1.3 | 1.3 | 1.3 | 1.3 |
| Vulkanox ZMB-2 | 0.5 | 0.5 | 0.5 | 0.5 | 0.5 |
| Rhenofit TRIM/S | 30 | 30 | 30 | 30 | 30 |
| Sartomer SR 633 | 30 | — | 30 | — | 30 |
| Sartomer SR 634 | — | 30 | — | 30 | — |
| Ethanox 703 | 1 | 1 | 1 | 1 | 1 |
| Zinc peroxide | — | — | 6 | 6 | 6 |
| Polydispersion T (VC) D-40 P | 6 | 6 | 6 | 6 | 6 |
| Armeen 18 D | 3 | 3 | 3 | 3 | 3 |
| Total parts by weight | 230.8 | 227.8 | 229.8 | 229.8 | 229.8 |
| Density (g/cm³) | 1.27 | 1.27 | 1.29 | 1.29 | 1.29 |

TABLE 4

| Mixture properties | Mixture 1a | Mixture 1b | Mixture 1c | Mixture 1d | Mixture 1e |
|---|---|---|---|---|---|
| MS-T5/120° C. | >45 | >45 | >45 | >45 | >45 |
| MDR rheometer 160° C./run time 40 min | | | | | |
| Minimum (S'dNm) | 1.6 | 1.5 | 1.4 | 1.5 | 1.5 |
| Maximum | 233.4 | 177.0 | 206.4 | 177.2 | 224.5 |
| Max.–Min. | 231.7 | 175.5 | 205.0 | 175.7 | 223.0 |
| T10 (min) | 3.0 | 3.6 | 3.7 | 4.2 | 3.5 |
| T50 | 4.3 | 6.0 | 5.9 | 6.2 | 4.4 |
| T80 | 7.8 | 13.8 | 10.5 | 11.9 | 6.3 |
| T90 | 10.2 | 19.7 | 14.3 | 16.9 | 7.9 |

TABLE 4-continued

| Mixture properties | Mixture 1a | Mixture 1b | Mixture 1c | Mixture 1d | Mixture 1e |
|---|---|---|---|---|---|
| MDR rheometer 180° C./run time 10 min | | | | | |
| Minimum (S'dNm) | 1.3 | 1.3 | 1.0 | 1.2 | 1.2 |
| Maximum | 232.9 | 176.2 | 170.1 | 139.6 | 229.4 |
| Max.–Min. | 231.5 | 174.9 | 169.1 | 138.5 | 228.2 |
| T10 (min) | 0.6 | 0.7 | 0.7 | 0.9 | 0.7 |
| T50 | 0.7 | 1.1 | 0.8 | 1.3 | 0.8 |
| T80 | 0.9 | 2.5 | 1.3 | 2.6 | 0.9 |
| T90 | 1.0 | 3.7 | 2.0 | 3.6 | 0.9 |
| Vulcanization 30 min 160° C. | | | | | |
| F (MPa) | 16.2 | 16.7 | 24.8 | 29.7 | 25.1 |
| D (%) | 63 | 94 | 48 | 69 | 33 |
| S 20 (MPa) | 11.2 | 9.7 | 18.5 | 21.6 | 24.0 |
| S 50 (MPa) | 14.2 | 12.7 | 25.7 | 27.6 | — |
| S 100 (MPa) | — | — | — | — | — |
| H 23° C. (Sh. A) | 98 | 99 | 99 | 99 | 99 |
| H 23° C. (Sh. D) | 64 | 60 | 68 | 68 | 70 |
| E 23° C. (%) | 53 | 45 | 44 | 43 | 52 |
| Tear propagation resistance to DIN 53515 (N/mm) | 35 | 33 | 28 | 35 | 37 |

The rubber mixtures listed in the Examples exhibit the advantageous properties stated above.

Further improvement in mechanical properties (in particular tensile strength) and hardness is achieved by blending carboxylated hydrogenated nitrile rubber with hydrogenated/partially hydrogenated nitrile rubber or by using this carboxylated hydrogenated nitrile rubber alone, which makes these rubber mixtures particularly suitable for the stated applications.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rubber mixture comprising
    a) at least one carboxylated hydrogenated nitrile rubbers and optionally a nitrile rubber
    b) from 10 to 120 phr of one or more metal salts of an acrylate
    c) from 5 to 80 phr of one or more liquid acrylates optionally applied onto a support,
    d) from 0.01 to 8 phr of one or more silanes, and
    e) optionally further additives and/or fillers.

2. A rubber mixture according to claim 1, wherein said nitrile rubber is selected from the group consisting of hydrogenated NBR, carboxylated NBR, partially hydrogenated carboxylated NBR and completely hydrogenated carboxylated NBR.

3. A rubber mixture according to claim 1, wherein the metal salt of the acrylate is a Zn diacrylate or a Zn dimethacrylate or a mixture thereof.

4. A rubber mixture according to claim 1, wherein the liquid acrytate is butanediol dimethacrylate or trimethyloipropane trimethacrylate or a mixture thereof.

5. A rubber mixture according to claim 1, wherein vinylsilane is used as the silane.

6. A rubber mixture according to claim 1, wherein said mixture further more contains a silicate filler, carbon black, zinc oxide, magnesium oxide or a mixture of two or more of these components.

7. A rubber mixture according to claim 1, wherein the mixture contains vulcanization retarders and/or vulcanization accelerators.

8. A vulcanizable rubber mixture comprising a rubber mixture, which comprises
    a) at least one carboxylated hydrogenated nitrile rubbers and optionally a carboxyiated nitrile rubber
    b) from 10 to 120 phr of one or more metal salts of an acrylate
    c) from 5 to 80 phr of one or more liquid acrylates optionally applied onto a support,
    d) from 0.01 to 8 phr of one or more silanes, and
    e) optionally further additives and/or fillers.

9. A molding comprising a rubber mixture, which comprises
    a) at least one carboxylated hydrogenated nitrile rubbers and optionally a carboxylated nitrile rubber
    b) from 10 to 120 hr of one or more metal salts of an acrylate
    c) from 5 to80 ohr of one or more liquid acrylates optIonally applied onto a support,
    d) from 0.01 to 8 phr of one or more silanes, and
    e) optionally further additives and/or fillers.

* * * * *